United States Patent [19]

Arvanitakis

[11] 3,997,406
[45] Dec. 14, 1976

[54] EVAPORATING APPARATUS

[76] Inventor: Kostas Savas Arvanitakis, 14945 S. Dogwood Ave., Orland Park, Ill. 60462

[22] Filed: Dec. 16, 1974

[21] Appl. No.: 533,205

Related U.S. Application Data

[63] Continuation-in-part of Ser. No. 408,185, Oct. 19, 1973, abandoned.

[52] U.S. Cl. .............................. 202/175; 159/25 R; 159/2 E; 159/6 WH; 55/208; 259/191; 425/208; 34/11; 34/73; 34/79

[51] Int. Cl.² ...................... B01D 1/00; B01D 1/22; B01D 3/00

[58] Field of Search ............... 159/1 RW, 1 C, 2 E, 159/6 W, 6 WH, 25 R, 25 A, 47 R, DIG. 10, DIG. 15, 9 R, 9 A, 18; 202/238, 175; 34/9, 11, 17, 73, 79, 92; 55/208, 268, 269; 34/108, 109, 126, 27, 129, 135, 142; 165/44, 143; 259/191, 192, 9, 10; 425/208

[56] References Cited

UNITED STATES PATENTS

| | | | |
|---|---|---|---|
| 408,824 | 8/1889 | Cazin | 159/18 |
| 2,440,778 | 5/1948 | MagLaughlin | 159/25 R |
| 2,542,270 | 2/1951 | Zahm | 159/6 W |
| 2,546,381 | 3/1951 | Zahm | 159/6 W |
| 2,992,679 | 7/1961 | Twaddle | 159/2 E |
| 3,054,729 | 9/1962 | Smith | 159/6 W |
| 3,072,626 | 1/1963 | Cines | 159/2 E |
| 3,080,303 | 3/1963 | Nerheim | 159/DIG. 15 |
| 3,117,953 | 1/1964 | Goebel et al. | 159/2 E |
| 3,150,214 | 9/1964 | Scalora et al. | 159/2 E |
| 3,156,677 | 10/1964 | Resnick | 159/2 E |
| 3,205,588 | 9/1965 | Oetjen et al. | 34/5 |
| 3,263,276 | 8/1966 | Maier | 159/2 E |
| 3,288,443 | 11/1966 | Lynch et al. | 259/9 |
| 3,334,680 | 8/1967 | McManus | 159/6 W |
| 3,357,479 | 12/1967 | Baird et al. | 159/6 WH |
| 3,372,095 | 3/1968 | Nester | 159/DIG. 15 |
| 3,439,724 | 4/1969 | Mason | 159/13 A |
| 3,799,234 | 3/1974 | Skidmore | 159/2 E |
| 3,812,897 | 5/1974 | Latinen | 159/2 E |
| 3,825,236 | 7/1974 | Hussmann et al. | 259/9 |

*Primary Examiner*—Jack Sofer
*Attorney, Agent, or Firm*—August E. Roehrig, Jr.

[57] ABSTRACT

A method of and apparatus for receiving low-volume liquid sludge concentrations, exposing the liquid-sludge slurry to a heating surface thereby evaporating a portion of the liquid from the slurry, and advancing the contaminant bearing liquid for further exposure to additional heating surfaces such that as the slurry passes therethrough, in thermal contact with the heating surfaces, the solids content is increased by evaporating the liquid material while allowing the solids material to accumulate on the heating surfaces which are automatically and continuously cleaned to maintain the efficiency of the system and discharge these materials in a substantially dry state.

10 Claims, 5 Drawing Figures

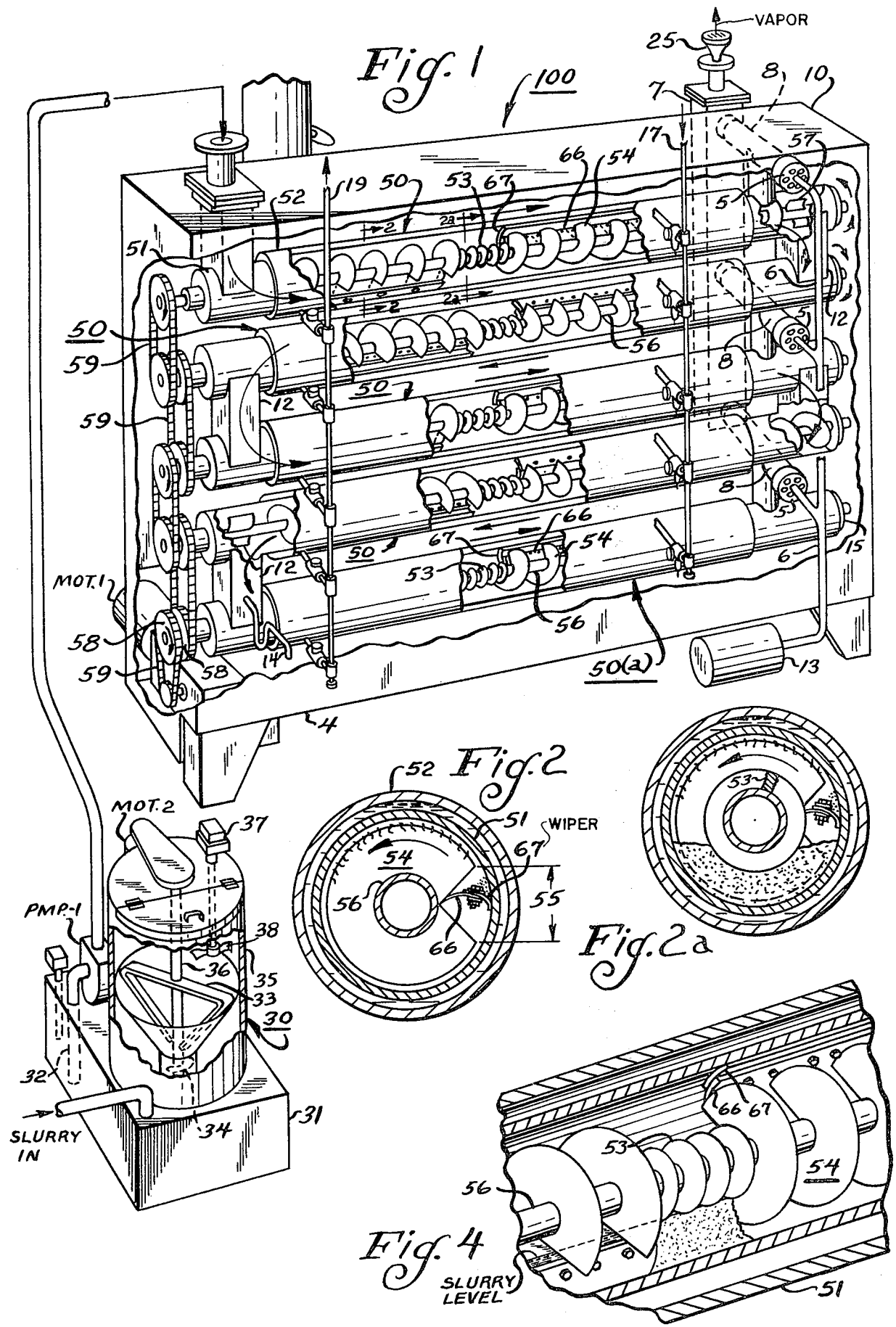

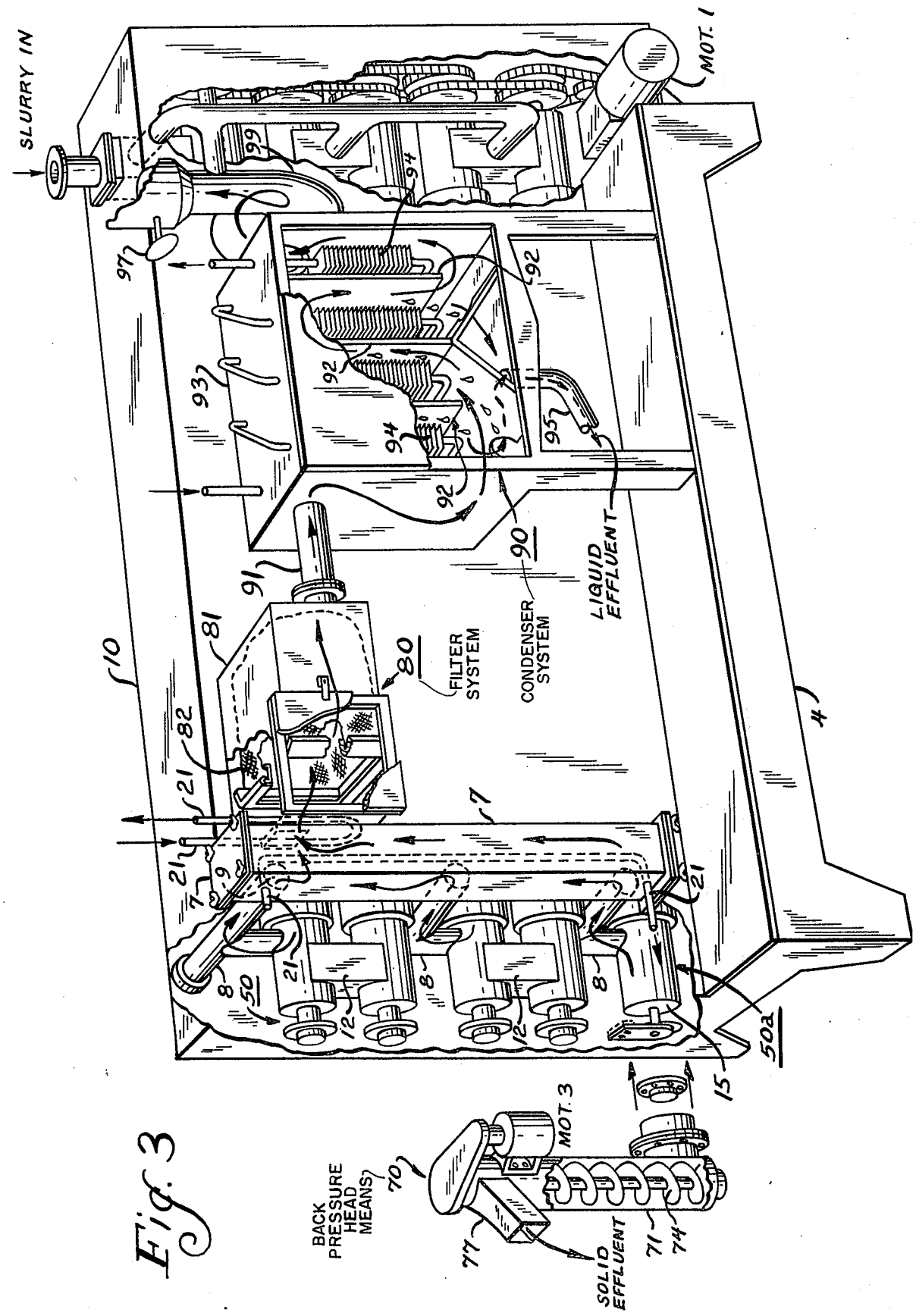

EVAPORATING APPARATUS

This application is a continuation-in-part of my copending application Ser. No. 408,185, filed Oct. 19, 1973, now abandoned.

BACKGROUND OF THE INVENTION

This invention relates in general to a method of and apparatus for disposal of liquid waste material having contaminants dissolved or suspended therein and, in particular, to an evaporator system for disposing of contaminant bearing liquid by separating the liquid from the solid or suspended contaminants and discharging the solids material as a dry waste discharge.

More specifically, this invention relates to an evaporating method and apparatus whereby unclarified contaminant bearing liquid is passed into the evaporator system and sequentially exposed to heat through a system of conveying augers. The contaminated liquid is exposed to a heated surface and applied thereto by the augers to evaporate the liquid from the slurry thereby increasing the solids content of the slurry until such time as the liquid is removed or separated from the solids, at which time the solids are discharged from the evaporator system as a dry waste material.

Evaporator or still systems for disposal of liquid waste materials are generally used for low-volume liquid sludge concentrations which cannot be disposed of economically through any treatment by filtration, separation or chemical methods. While evaporation or distillation has been found to be the only economical method for disposal of certain types of contaminant bearing liquids, the existing systems have been found to be inefficient and unsatisfactory. In certain types of applications, such as contaminated water, the liquid portion of the contaminated liquid is usually boiled away until the solids concentration reaches a suitable percentage such that it may be manually removed from the still or distillation vat. In other types of situations, such as contaminated oil and water mixtures, the water is usually boiled off from the mixture leaving the oil bearing the contaminants. To dispose of the oil and contaminant slurry requires costly, inefficient and time consuming operations of the distillation apparatus.

Evaporation or distillation systems utilized in the treatment of contaminated liquids dispose of these materials by heating the liquid slurry until the liquid has reached its boiling point whereby the liquid is transformed into a vapor. The vapor can be vented into the atmosphere or passed through a condensing chamber for condensation if the liquid is to be recovered. The systems disclosed in the prior art are very inefficient due, in part, to the accumulation of the contaminants or solids material on the heating surfaces as the liquid material is evaporated from the slurry. This gradual buildup of the solids material on the heating surface prevents maximum heat transfer resulting in inefficient distillation, slow reclamation of the liquid and disposal of the solids.

Upon initial start up, the still apparatus efficiently transfers heat to the contaminated slurry. As the solids content is increased through the evaporation of distillation of the liquid, the resulting buildup of the solids material on the heating surface retards heat transfer to the slurry slowing the process and increasing its inefficiency. Certain types of existing distillation apparatus are placed under a vacuum to lower the pressure in the distillation chamber thereby decreasing the boiling or evaporation point and requiring less heat energy to effect evaporation. However, whether the distillation or evaporator apparatus is of the type wherein the distillation chamber is placed under a vacuum or is under atmospheric pressure, the device is still subjected to the problem of the solids buildup on the heating surface which retards the heat transfer and increases the system's inefficiency.

A further problem associated with known systems occurs since the distillation chambers of these devices are of a fixed volume. The slurry or liquid-solids contaminants which are placed within the distillation chamber are quiescent except for the agitation created when the liquid slurry is brought to its boiling point creating turbulence of the liquid and contaminants. However, as the liquid-solid slurry is agitated increasing the vaporization rate of the liquid from the slurry, the solids material begins building up on the heating surfaces forming an insulation barrier thereby decreasing the efficiency of the system and necessitating frequent cleaning of the distillation apparatus and sludge removal. In these devices the entire system must be shut down for the cleaning and removal of sludge from the distillation chamber. Therefore, none of these existing systems are sufficient to provide an efficient, economical method or apparatus for disposal of the low-volume liquid sludge slurries.

SUMMARY OF THE INVENTION

It is, therefore, an object of this invention to improve the method of and apparatus for disposal of low-volume liquid sludge concentrations.

Another object of this invention is to remove the liquid from the liquid sludge slurry and to dispose of the solids material in an efficient and economical manner.

Still another object of this invention is to improve evaporator or distillation systems by continually passing liquid sludge slurries through the evaporator system in a continuous operation.

A further object of this invention is to continuously apply the liquid-sludge slurry to a heating surface thereby evaporating the liquid while removing the solids material which adheres to the heating surface for return back into the liquid increasing the solids content of the slurry as the mixture is advanced in continuous exposure to the heating elements for disposal of the solids materials.

These and other objects are attained in accordance with the present invention wherein there is provided a method of and apparatus for receiving low-volume liquid sludge concentrations, exposing the liquid-sludge slurry to a heating surface thereby evaporating a portion of the liquid from the slurry, and advancing the contaminant bearing liquid for further exposure to additional heating surfaces such that as the slurry passes therethrough, in thermal contact with the heating surfaces, the solids content is increased by evaporating the liquid material while allowing the solids material to accumulate on the heating surfaces which are automatically and continuously cleaned to maintain the efficiency of the system and discharge these materials in a substantially dry state.

DESCRIPTION OF THE DRAWINGS

Further objects of this invention together with additional features contributing thereto and advantages accruing therefrom, will be apparent from the following description of one embodiment of the invention when read in conjunction with the accompanying drawings wherein:

FIG. 1 is a perspective view of the subject matter of this invention which continuously separates the liquid from a liquid solid slurry and automatically removes the sludge or contaminants from the evaporator system;

FIG. 2 is an enlarged sectional view of a portion of the evaporator system taken along lines 2—2 of FIG. 1 to better illustrate the means for applying the liquid slurry to the heating surface and removing the solids material therefrom;

FIG. 2A is an enlarged sectional view of a portion of the evaporator system taken along lines 2A—2A of FIG. 1 to better illustrate the buildup of slurry created by the section of auger which is smaller in diameter and between the two lengths of the larger augers, while still allowing the free passage of vapors;

FIG. 3 is a rear perspective view of the evaporator system illustrating an exhaust manifold utilized to recover or dispose of the vapors from evaporation of the liquids, a trap for dried solid materials that may be conveyed with the vapors, a multi-stage condensor for condensing the vapors and reclaiming the distilled liquid, and a vertical auger which may be used to dispose of certain solids materials; and FIG. 4 is an enlarged perspective view of a portion of the auger system for exposing the slurry materials to the heating surface and removing the accumulation of solid materials therefrom.

DESCRIPTION OF A PREFERRED EMBODIMENT

Referring now to FIG. 1, there is shown an evaporator or distillation system which is the subject matter of this invention. The evaporator system 100 includes a plurality of heat transfer conveying units 50 which function to expose the liquid sludge slurry to heating surfaces thereby evaporating the liquid and raising the solids content of the slurry as the contaminant bearing liquid is conveyed through the heating stations in the direction indicated by the arrows. The contaminated liquid is passed into the evaporator system through the inlet 11 to the uppermost heat transfer conveyor unit 50. The heat transfer conveying unit 50 includes a cylinder 51, into which the contaminated liquid is passed, having a steam jacket 52 surrounding the cylinder 51 substantially throughout its entire length such that the inner surface of the cylinder 51 is elevated to a temperature above the boiling or evaporation point of the liquid in the liquid-solid slurry passed thereinto. While the embodiment shown untilizes a steam jacket for effecting the heating of the cylinder 51, it is to be understood that hot oil or an electrically heated jacket may be utilized for this function as well as any other means for heating the interior of the surface of the cylinder 51 to the desired temperature.

The contaminated liquid entering the uppermost heat transfer unit 50 through the inlet 11 is advanced by this unit while being exposed to heat, and passes downward from the opposite end thereof as indicated by the direction of the arrow. The heat transfer conveyor unit 50 has an auger 54 rotatably journalled in suitable end caps which enclose the two ends of the cylinder forming a water and vapor tight closure. As best shown in FIGS. 2 and 4, a portion of each auger flight is removed (55) and a resilient metal strip 66, suitably secured to the auger shaft 56, extends between adjacent flights of the auger. The metal or resilient strip 66 extends outwardly from the auger shaft 56 to a position adjacent but not in contact with the inner surface of the cylinder 51. A blade 67 formed of or coated with a tetrafluoroethylene polymeric or similar material is secured to the support strip 66 and extends therefrom into wiping contact with the interior surface of the cylinder 51. While the auger 54 functions to convey materials in the direction indicated by the arrows, the resilient support strip 66 bearing the polymeric blade 67 in contact with the inner wall of the cylinder 51 functions to spread or squeegee the liquid-solid slurry throughout the entire inner surface of the heated cylinder 51. The coated blade 67, biased by the resilient support strip 66, applies the slurry to the entire inner surface of the cylinder 51 during rotation of the auger 54 thereby increasing the thermal contact area of the slurry with the heated surface to increase the distillation or evaporation efficiency. In addition, since the slurry is applied in a thin film to the inner surface of the cylinder, the evaporation occurs at a greater rate resulting in increased solids accumulation along the inner periphery of the cylinder 51.

While the rotation of the auger 54 applies the liquid-solids slurry to the inner surface of the heated cylinder 51, the action of the resilient support 66 biasing the polymeric blade 67 into contact with the inner surface walls of the heated cylinder 51 scrapes or removes the solid material from the inner surface at that point, thereby preventing a buildup of the solids material which would decrease heat transfer efficiency. As the solids material is scraped or removed from the inner surface of the heated cylinder, it is returned to the liquid-solids slurry increasing the percentage of solids and facilitating the transfer of the material through the heated auger system.

At a point roughly midway on each auger shaft 36 are a series of smaller augers 53 which serve to maintain a certain amount of sludge buildup or sludge "dam" in the area defined by the smaller auger. This dam traps an increased amount of slurry behind it and prevents liquid from freely circulating through the system, as shown in FIG. 4.

The sludge buildup caused by these smaller augers 53 also restricts the freedom of movement of the less viscous slurry, thereby insuring increase in the solids content of the sludge on each successive conveyor unit 50.

Continuous movement of the sludge material is assured since the larger augers 54 will tend to add a certain amount of sludge at the inlet end of the buildup while slicing off an equal amount at the opposite end. In addition, the smaller augers prevent or complete sludge plug from forming to block the cylinder to thereby allow free passage of the vapors evolved from the sludge throughout the system. The action of the smaller augers 53 in maintaining a cleared area in their rotation is illustrated in FIG. 2A.

As the contaminated liquid is advanced through the heat transfer conveyor unit 50 it reaches the end opposite to the inlet and is directed from the first heated transfer conveyor unit 50 through an outlet 12 which functions as an inlet to the next heat transfer conveyor unit. When the liquid-sludge slurry reaches the terminal end of a heat transfer conveyor, a deflector guide 57 secured to one end of the auger shaft 56 directs the slurry out from the column through the discharge outlet 12 into the next heat transfer conveyor unit 50. The structure of each of the heat transfer conveyor units 50 is the same as that previously described and, therefore, like reference numerals indicate like parts.

As the contaminated liquid is advanced from one heat transfer conveyor unit 50 to the next heat transfer conveyor unit 50, the percentage of solids increases due to the evaporation of the liquid from the slurry and the continuous scraping of the solids material from the heated surface, which are added back into the slurry. This sequential advancing of the slurry in thermal contact with the heated surface of the conveyor unit 50 eventually removes the liquid from the slurry resulting in the discharge of dry or semi-dry solids from the outlet 15 of the heat transfer conveyor 50a. The progressive removal of the liquid from the slurry as the mixture advances through the conveying units 50, changes the consistency of the slurry such that the deflectors 57 carried at the terminal end of each auger shaft 56 must sometimes be strengthened to force the materials into the subsequent conveying unit. The forcing of the materials by the deflectors 57 squeezes these materials which facilitates removal of the liquid therefrom to more efficiently obtain a dry waste discharge.

Referring again to FIG. 1, the heated conveyor units 50 are heated by means of a steam line 17 suitably connected to each of the steam jackets 52 by means of valves 18, and returned thereto by means of the outlet line 19. The augers 54 are rotatably driven by means of a drive motor MOT-1 carried by frame 4 upon which the heat transfer conveyors 50 are supported in substantially parallel spaced relationship. A housing 10 supported by the frame encloses the heat transfer units 50 to provide a protective covering preventing accidental contact with the heated elements of the evaporator system.

The drive motor MOT-1 is coupled to a portion of the auger shafts 56 which extend without the housing 10 with each having a suitable drive gear 58 secured thereto and operatively connected to the drive motor by means of a flexible drive system such as chains 59.

An exhaust manifold 7 is carried by the frame 4 adjacent the housing 10 and is connected to alternate cylinders 51 of the heat transfer conveyors 50 by means of exhaust ducts 8 for withdrawing vapors formed during operation of the heat transfer conveyors 50. As the vapors created by evaporating the liquid from the slurry pass out of the manifold 7, they are vented to the atmosphere, burned by passing through an exhaust gas burner 25, or treated in a manner to be hereinafter described in more detail. A blower, not shown in FIG. 1, may be connected to the exhaust manifold to draw the vapors from the cylinders 51.

In one embodiment of the invention, it is found desirable to carry out the operation described above in an inert atmosphere. To this end an inert gas cylinder 13 of nitrogen or the like is connected by means of piping 6 to an inlet 5, which may be rotatably adjusted to allow varying mixtures of inert gas to air to enter the system, through the exhaust duct 8. The system may then be closed above the exhaust blower 99 by means of a suitable valve 97, so that after the gases have been dried up they may be returned to the system to pick up more vapor and thus be recycled. In this manner noxious gases will not be vented to the atmosphere, but rather within the evaporator.

In some applications, it is desirable to add chemical reagents to the contaminant bearing liquid prior to passing the liquid into the evaporator system. In certain applications reagents are added (such as activated carbon) as the contaminated liquid may have an offensive odor which would be discharged into the atmosphere even subsequent to treatment and, for example, in other applications it may be necessary to add certain chemical reagents to the contaminated liquid (such as lime which regulates the pH) to assist in coagulation or flocculation of the liquid to assist in processing through the evaporator.

In such applications, a dispensor 30 is utilized to add the reagent to the liquid prior to its passing through the inlet 11 of the evaporator. The dispenser 30 includes a chamber 31 formed as a liquid-tight housing having a discharge outlet 32 coupled to a feeder pump PMP-1 for withdrawing the contents of the chamber 31 into the evaporator 100. As the feeder pump PMP-1 is energized to forward the contaminated liquid to the inlet 11 of the evaporator, a drive motor MOT-2 is energized to rotate agitator 33 and feed auger 34 within the hopper 35. The feed motor MOT-2 is suitably secured to the hopper 35 and connected by suitable driving elements to rotate shaft 36 extending longitudinally within the hopper and having secured thereto the agitator 33 and feed auger 34. The bottom of the hopper is formed in a conical shape and is secured within the hopper to prevent any of the material contained therein from being discharged except through the outlet in the bottom of the cone in which the auger 34 is carried. A portion of the top closure of the hopper 35 is hinged so that it may be opened to replenish or change the chemical reagents carried therein.

When the drive motor MOT-2 is energized, the drive train to the feed auger 34, and the pitch thereof, dispenses a controlled premeasured amount of reagent into the chamber 31 which mixes with the contaminated fluid therein and is pumped by the feeder pump PMP-1 to the inlet 11 of the evaporator. Therefore, the amount of reagent which is added to the contaminated liquid may be closely controlled through the coordinated operation of the feeder pump PMP-1 and the dispensing motor MOT-2. A level sensor 37 may be utilized within the hopper 35 to monitor the amount of reagents in the hopper, and a valving system 38 comprising a float valve may be utilized to operate the feeder pump PMP-1 to control the rate of flow of the contaminated liquid to the evaporator.

Referring now to the embodiment disclosed in FIG. 3, there is shown the evaporator system for use with contaminated liquids which have a higher boiling point than the contaminated water system heretofore described. In such applications (e.g., contaminated oil and water mixtures) the contaminated liquid may be fed into the chamber 31 whereat chemical reagents are fed by the dispenser 30 into the mixture and the mixture pumped from the chamber to the inlet 11 of the evaporator. The contaminated mixture passes into the cylinder 51 of the heat transfer conveyor 50 and is advanced by means of the augers 54 which apply the slurry to the inner surfaces of the cylinder through the wiping operation of the teflon strip 67 supported on the resilient metal support 66. As the mixture sequentially advances from one heat transfer conveyor 50 to a subsequent heat transfer conveyor 50 the water portion of the mixture is evaporated and passes out from the cylinder 51 through the exhaust ducts 8 into the exhaust manifold 7. As the slurry moves through the sequential heat transfer conveyor systems 50, when it reaches the lowermost unit 50a the material will retain a substantial amount of oil.

In these applications a vertical auger system 70 is utilized at the discharge outlet 15 of the lowermost heat transfer conveyor 50a. This vertical auger unit comprises a cylinder 71 in which a vertical auger 74 is rotatably journalled in end caps which form a liquid-tight enclosure of the cylinder 71. A drive motor MOT-3 is suitably supported from the cylinder 71 and forms a drive connection with an extended portion of the vertical auger shaft. Upon energization of the drive motor MOT-3, the auger 74 is rotated raising the sludge from the discharge outlet 15 of the heat transfer unit 50a to the top of the cylinder whereat a deflector guide, not shown, expels the sludge through a chute 77 for disposal. The cylinder 71 extends a vertical height sufficient such that a pressure head is created by the materials therein such that the contaminated oil can be drawn off from the lowermost heat transfer conveyor 50a by means of gravity at the trapped outlet 14. In the operation of the evaporator wherein the vertical auger system 70 is utilized, liquid is drawn off through the trapped outlet 14, and the sludge is advanced to the discharge end 15 for passage into the vertical auger system 70 which elevates the sludge for disposal.

Referring again to FIG. 3, when it is desirable to recover the liquid which is vaporized from the slurry, a condensor system 90 is employed. In these systems, the exhaust manifold 7 and exhaust duct 8 system function the same as previously described. However, additional steam lines 21 may be employed to maintain the vaporous condition of the liquid. In such applications, a dried solids filter system 80 is employed between the outlet of the exhaust manifold and the entrance to the condenser system.

The dried solids filter system 80 comprises a housing 81 suitably supported from the evaporator housing 10. A filter bag 82 is carried within the housing in the path of vapor movement and is of a type suitable for removing the dried solids contaminants which may be carried with the liquid vapors. The vapors pass from the outlet 9 of the exhaust manifold into the filter system 80, through the filter bag 82, and into the condenser system 90. A door 83 is hingedly carried by the filter housing 81 to facilitate replacement of the filter bag 82, as necessary.

The condensor unit system 90 is connected to the outlet of the solids particle filter system 80 to receive the vapors passed therethrough to the inlet port 91 of the condenser. The vapors are passed through a multipartition 92 condenser chamber 93 having condensing coils 94 carried therein through which pass a heat exchange medium. While various liquids may be passed through the condensing coils to condense the vapors, it has been found that cold water is generally suitable for most applications.

The vapors are drawn through the chamber 93 by means of an exhaust fan or blower 99 carried at the outlet port of the chamber which vents the condenser exhaust from the recovery system. As the heated vapor passes through the condensing chamber 93 contacting the condensing coils 94, the vapor is condensed on the outer surface of the coils and flows out through the bottom 95 into a suitable container.

In operation of the systems heretofore described, the heating means 52 is activated to preheat the evaporator for a period of time until the predetermined temperature level is reached. This temperature is preferably approximately 75° F. – 100° F. higher than boiling point of the slurry. The temperature control should be adjusted in relation to the solid consistency (percentage of solids), type of liquid, boiling point, and auger speed (rpm) of the slurry. At higher auger speeds, the heat energy or temperature must be increased thereby increasing the system's efficiency. For optimum efficiency when treating slurries having a lower boiling point and thereby requiring less heat energy, the system should be placed on vacuum. When the system is placed on vacuum, the exhaust blower 99 is activated during preheat forming a slight vacuum of approximately 5–10 inches of mercury withdrawing air through the system and exhausting it into the atmosphere. The augers are then activated after preheat has been obtained.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teaching of the invention without departing from the essential scope thereof. Therefore, it is intended that this invention not be limited to the particular embodiments disclosed as being the best mode contemplated for carrying out this invention, but that the invention will include all embodiments falling within the scope of the appended claims.

1. Apparatus for disposing of contaminated slurries comprising liquid bearing solids materials therein, including
   auger conveyor means including a cylindrical chamber and a rotating auger screw with flights therealong for advancing a slurry of contaminated liquid bearing solids materials therein,
   means for passing said slurry to said auger conveyor means,
   heating means in thermal contact with said auger conveyor means to provide a heated interior surface in said chamber for heating said surface to a temperature sufficient to vaporize at least a portion of the liquid from the slurry,
   means operatively connected to said auger conveyor means for applying the slurry to said heated surface thereby evaporating a portion of the liquid and forming a residue of slurry on said surface, and removing the residue so formed from said surface,
   means for increasing the solids materials in a zone along a portion of the auger screw and chamber between the ends thereof comprising substantially reduced diameter portions of the peripheries of the auger flights with respect to the diameters of the auger flights immediately upstream and downstream thereof, for forming a partial obstruction in said zone composed of said residue of slurry for impending the flow of said liquid slurry material, while allowing passage of the vapors created in the vaporization process, and
   means for withdrawing said residue so formed from said apparatus.

2. The apparatus of claim 1 wherein said means operatively connected to the auger screw for applying the slurry to said heated surface forming a residue and removing the residue from said surface, returns said residue to the slurry.

3. The apparatus of claim 1 further including means for creating a pressure head in the residue discharge end of the heated chamber to accumulate a liquid portion of the slurry, said means for creating a pressure head comprising means for elevating the solids materials to a position above the withdrawal point for accumulated liquid and means for withdrawing the accumulated liquid portion of said slurry.

4. The apparatus of claim 1 wherein said auger conveyor means comprise a plurality of serially connected.

5. The apparatus of claim 1 wherein said means for applying the slurry to said heated surface forming a residue and removing the residue from said surface comprises a wiper operatively connected to said auger screw.

6. The apparatus of claim 5 wherein said wiper comprises a resiliently supported member extending outwardly from said auger screw into contact with said heated surface.

7. The apparatus of claim 6 wherein at least a portion of said wiper contacting said heated surface is a tetrafluoroethylene polymeric material.

8. The apparatus of claim 1 further including means for withdrawing said vapors formed in said auger conveyor means.

9. The apparatus of claim 8 further including means for removing entrained solids materials from the vapor stream withdrawn from the auger conveyor means with said vapors.

10. The apparatus of claim 9 further including means for condensing the vapors passed through the means for removing solids materials therefrom for reclaiming the evaporated liquid.

* * * * *